Oct. 13, 1970  M. G. BROWN ET AL  3,533,698
OPTICAL COMPARISON HEMOGLOBINOMETER WITH A
ROTATABLE LIGHT SOURCE
Filed Sept. 11, 1967
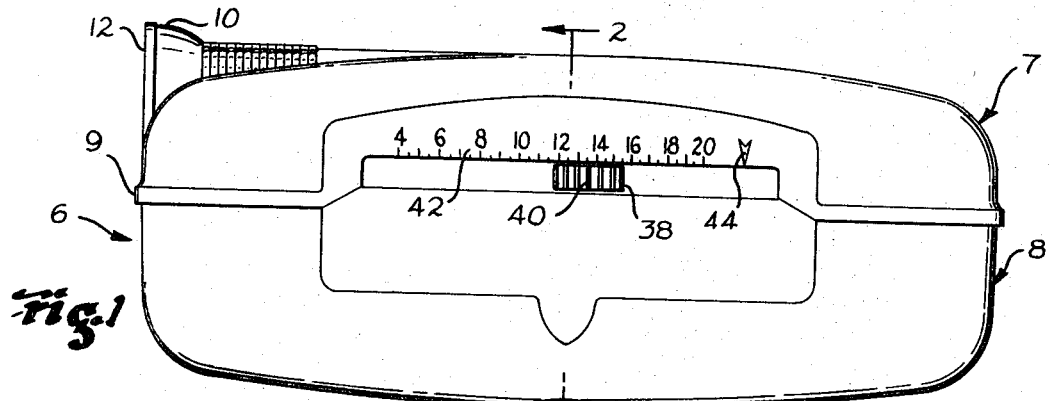
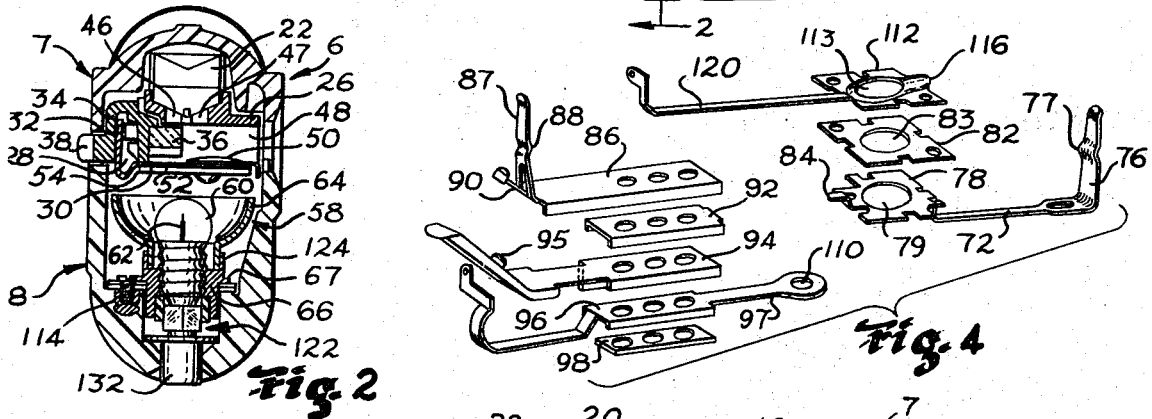
INVENTORS
MORDEN G. BROWN
NORMAN W. SHATZEL
BY
*H. Albert Hultquist*
ATTORNEY

United States Patent Office  3,533,698
Patented Oct. 13, 1970

1

3,533,698
OPTICAL COMPARISON HEMOGLOBINOMETER WITH A ROTATABLE LIGHT SOURCE
Morden G. Brown, Woodstock, Conn., and Norman W. Shatzel, Williamsville, N.Y., assignors to American Optical Corporation, Southbridge, Mass., a corporation of Delaware
Filed Sept. 11, 1967, Ser. No. 666,789
Int. Cl. G01j 3/48; G01n 1/10, 33/16
U.S. Cl. 356—40       2 Claims

ABSTRACT OF THE DISCLOSURE

Improvement in an instrument whereby light bulbs with off-centered filaments may be laterally adjusted by rotation of a light source adjusting unit and thereby insure laterally uniform illumination along the dividing line formed by the dihedral angle of the biprism.

BACKGROUND OF THE INVENTION

(1) Field of the invention

An instrument for measuring the hemoglobin content of blood with particular reference to improvements in the apparatus for laterally adjusting the light source so as to provide for laterally uniform illumination along the dividing line formed by the dihedral angle of the biprism should the filament of the light bulb be laterally off-center.

(2) Description of the prior art

Hemoglobinometers heretofore known as, for example, in U.S. Pat. No. 2,396,260 assigned to the assignee of the present application measure the hemoglobin content of blood by allowing light from a source to pass first through a filter and then simultaneously through a blood sample and a tapered optical wedge via two parallel paths which converge while passing through a reflecting biprism and form a split light field, which, in turn, is seen through a sighting device and by manipulation of the tapered optical wedge, the intensity of the projected light in the two converging paths is matched on a viewed field. The tapered optical wedge is so designed that its movement changes the intensity of the viewed light to a degree that can be calibrated to correspond to the intensity of light passing through various blood samples containing known amounts of hemoglobin. The prior art hemoglobinometers' accuracy depends on a light source which is accurately centered laterally so that the light intensity of each of the converging paths is essentially equal along the dividing line of the reflecting biprism. However, unless the filament of the bulb is accurately centered laterally, the viewed field would have un-uniform illumination along the dividing line and make matching of the viewed light inaccurate at the corresponding setting of the wedge. The first bulb is selected with a centered filament when the instrument is manufactured so that no difficulties arise unless the filament of the bulb is laterally off-centered as may occur when the original bulb needs to be replaced, since commercially available bulbs may contain filaments that are not perfectly centered. The improvement of this invention comprises a unit whereby bulbs with off-centered filaments can be adjusted laterally without disassembling the instrument. In order to facilitate the operation of centering the bulb, the tapered optical wedge of this invention is short enough in length so that it may be retracted from the light path by moving the sliding knob to a zero-set position mark or calibrating position at one end of the scales molded in the instrument casing. With the tapered optical wedge in this zero-set position, the operator may easily determine if the viewed field is uniformly illuminated along the dividing line and make an adjustment if necessary. Of course, no blood slide is in position in the other path during this operation but the slide holder itself is inserted to block stray light.

SUMMARY OF THE INVENTION

An optical instrument for measuring the hemoglobin content of a blood sample in grams per hundred millimeters or any other convenient units. The instrument operates by having a light from a light source pass simultaneously through two parallel paths, one through a tapered optical wedge, the other through a removable slide containing the blood sample. The two parallel paths of light are then reflected and converged by a reflecting biprism onto two halves of a viewed field. The viewed field is seen through a sighting device containing a colored filter in an end wall of the instrument casing. By manipulation of the tapered optical wedge, the intensity of light on each half of the viewed field is matched along the dividing line and the direct reading of the hemoglobin content of blood is read from a calibrated scale molded on one side of the instrument. Accordingly, an object of the invention is to provide an instrument having a light source adjusting unit whereby light bulbs containing off-centered filaments may be laterally centered without disassembling the instrument should the viewed field show un-uniform illumination along the dividing line of the reflecting biprism when matched in the zero-set test.

DESCRIPTION OF THE DRAWINGS

FIG. 1 is a side elevation view of an embodiment of the invention;

FIG. 2 is a transverse sectional view taken substantially on line 2—2 of FIG. 1;

FIG. 3 is a side view opposite to FIG. 1 and showing the major portions in section;

FIG. 4 is an isometric exploded view of the electrical conductors employed in this invention; and FIG. 5 is an exploded perspective view of the light source centering unit.

DESCRIPTION OF A PREFERRED EMBODIMENT

Referring to the drawings in FIGS. 1 through 3, the instrument is comprised of a casing generally indicated by the numeral 6 comprising an upper section 7 and a lower section 8 detachably secured together and having interfitting abutting edges indicated by the numeral 9. The casing is generally made of molded plastic, but may be formed of any other suitable material. Located in an end wall of the upper casing is a sighting device 10 containing an eye piece 12 and a color filter 14 (FIG. 3). Adjacent to the sighting device longitudinally arranged to the mid-point of upper casing 7 is sighting chamber 16. Aperture 18 in sighting chamber 16 forms the border for split viewed field 20. Adjoining sighting chamber 16 is reflecting biprism 22 which is securely positioned in place by means of spring plate 24 which, in turn, is integrally joined to the unitary or integral frame member 26 which is shaped to provide an elongated longitudinally disposed guideway 28. Biprism 22 forms a dihedral angle as it adjoins sighting chamber 16. The central dividing line of the dihedral angle is seen as a dividing line in aperture 18 and splits viewed field 20 into two light fields. Forming a partition between sections 7 and 8 and located in the lower portions of upper section 7 is separation plate 30. Integral frame member 26 is secured to separation plate 30 by means of screws or any other suitable device. Separation plate 30 is bent vertically to the plane of said plate to form guide track 32 for carriage 34 containing tapered optical wedge 36. Integrally formed and part of carriage 34 is slider knob 38 having cursor 40 etched therein. Molded on one side of the instrument casing are calibrations 42 containing a zero-set characteristic index mark 44. Tapered optical wedge 36 is so designed that when the cursor 40 of slide knob 38 is retracted to characteristic index mark 44, tapered optical wedge 36 will be retracted from the path of light. Integral frame member 26 also forms apertures 46 and 47 and chamber 48, into which is placed the blood slide, not shown. In chamber 48 are two spring clips 50 for resiliently holding the blood slide in position. The blood slide is inserted in chamber 48 by means of a holder which is not shown in the drawing. Separation plate 30 has formed in its aperture 52 directly under apertures 46 and 47 in integral frame member 26 which are all directly positioned under reflecting bi-prism 22. Directly under aperture 52 is diffusion plate 54 secured in position in separation plate 30 by screws 55 and 56 which also secured integral frame member 26 to separation plate 30. Positioned below diffusion plate 54 is light source 58 comprising a bulb 60 with a filament 62 and a reflector 64. Supporting light source 58 is socket shell 66 containing flanged sleeve 67. In lower case are spring plates 68 and 69 secured to the walls of the case section 8 and so designed as to clip into openings in separation plate 30 and form means whereby sections 7 and 8 are detachably secured together. Spring plates 68 and 69 are held in place in section 8 by means of screws 70 and 71. Since the details of construction and operation of these parts of the device are clearly set forth in earlier patent referred to above and form no part of the present invention, they will not be discussed in detail herein. Those interested in such details may refer to such patent for additional information.

The instrument is designed to operate on either internal or external sources of electrical energy. The source of internal energy is comprised of two common flashlight battery cells (not shown in the drawings) which are supported within lower casing 8. Electrical conductor 72, secured by screw 73 threaded into a metal bushing 74 in the lower section, is bent vertically to form outer arm portions 76 and makes contact at point 77 to one pole of one cell of the battery. This outer arm 76 forms a resilient spring which maintains the battery cell in a stable position. The opposite end of conductor 72 is bent upwardly and then horizontally to provide supporting plate 78 having aperture 79 (FIG. 4) and rests on internal footing 80 in lower casing section 8. Positioned over supporting plate 78 is insulating plate 82 which contains aperture 83. When viewed from above, apertures 79 and 83 are of the same approximate size and are so designed so as to receive socket shell 66. Supporting plate 78 is provided with a second arm 84 extending upwardly and horizontally through a notch in insulating plate 82 to make contact with an opposing pole of the other cell of the battery. Making contact with the opposite pole of this cell of the battery is conducting plate 86, which is bent upwardly to form upstanding arm 87 which makes actual contact with said opposite pole at point 88. Punched or bent out of conducting plate 86 is conducting arm 90. Upstanding arm 87 is curved outward to form a resilient spring for maintaining the cell in a stable position. Positioned under conducting plate 86 in a stacked arrangement is insulating plate 92, conducting member 94 having formed therein contact point 95, conducting member 96 and insulating plate 98 (FIG. 4). Securing these members together is insulating rivet 100 and said members are further secured into lower section 8 by screws 101 and 102. Said members are so designed that in normal usage with an internal battery conducting member 94 is in electrical contact with conducting member 96 and conducting plate 86 makes contact through conducting arm 90 to contact point 95 of conducting member 94. When the instrument is to be used with an external source of power, the connecting means (to be described later) breaks the contact between arm 90 and contact 95 thus disconnecting the internal battery. Positioned at the base of light bulb 60 is driver 108 which can be moved axially to make electrical contact with bulb 60. Driver 108 is of conducting material and contains a ridge 109 (FIG. 5). Conducting member 96 has formed in it spring arm 97 (FIG. 4) and an aperture 110, so designed as to conductively engage ridge 109 of driver 108 and allow rotation of driver 108 while maintaining electrical contact. Over insulating plate 82, previously described, is positioned conducting plate 112 having an aperture 113 to receive the outer shell of the lamp socket (FIG. 4). The stack of plates 112, 82 and 78 and socket shell 66 carried thereby is held on its predetermined position by screws 114 (FIG. 2) driven into holes in the lower casing 8. Formed as a part of conducting plate 112 is arm 116. Arm 116 makes electrical contact with remaining pole of a cell of the battery first described. The current may then flow from one pole of the battery in contact with 87 through contact 90 and 95 to member 96 through spring arm 97 to driver 108 into bulb 60, through socket shell 66 to arm 113 of plate 112 to one pole of the other cell of the battery from the other pole of said other cell, through 76 to contact 84 which controls the other pole of the first cell.

In order to use the instrument with an external source of current as the source of electrical energy, there is formed in an end wall of lower casing 8 socket 104 having contact pins 106. Extending into socket 104 is contact operating roller 118 which is deflected downwardly when a plug is inserted into socket 104, moving contact 95 away from contact 90. One of the contact pins is connected to 96 and the other to extension 120 of plate 112. Great detail is not given to the operation of switching for an external source of current since that is unchanged from the prior art and forms no part of the invention. It is fully explained in a prior U.S. Pat. No. 2,486,956 granted Nov. 1, 1949, and assigned to assignee of the present application.

Located in the central portion of lower casing 8 is the light source centering unit 122, shown in an exploded perspective view in FIG. 5. Bulb 60 is screwed into socket shell 66 which has unstanding collar 124 for frictionally holding reflector 64 in position. Socket shell 66 is made of electrical conducting material and has formed in its bottom portion a recess 126 into which non-conducting insert 128 is pressed, friction-tight so that it essentially becomes an integral part of socket shell 66. Other means of securing insert 128 in recess 126 may also be used, if desired. Insert 128 has hexagonal-shaped aperture 130 into which the hexagonal end of driver 108 is slidably received. Thus, driver 108 may move freely axially without causing movement of insert 128 or socket shell 66 but when rotated, the hexagonal portion of driver 108 engages hexagonal aperture 122 of insert 128 to cause rotation of insert 128 together with socket shell 66. After driver 108 is assembled with spring arm 97, the shank of driver 108 receives wave washer 131 and operating button 132 is then pressed into the shank of driver 108. Conductivity is assured by the spring action of wave washer 131. The shank may be knurled, if desired, in order to assure that driver 108 and button 132 are constrained to always move together either in rotation or axial translation. Button 132 is received in an aperture in lower casing 8 so that it may be pressed inwardly by a finger of the operator to bring driver 108 into contact with the end contact of bulb 60 to complete the circuit for illuminating the bulb. Spring arm 97 normally biases driver 108 away from the bulb contact. Button 132 is provided at its outer end with groove 134 to receive a screw driver, a coin or any other similar device for turning it, and with it, the entire centering unit 122.

It will thus be apparent that if filament 58 of bulb 60 is eccentrically located, rotation of button 132 will rotate the entire assembly of bulb and socket so that the filament can be adjusted so that with respect to a longitudinal central axial plane of the instrument equal amounts of filament are on either side of the plane and both light paths through the optical system are provided with equal amounts of light. The fact that the filament may be located at some position along said plane other than that along which the longitudinal axis of the socket lies is immaterial.

This operation is, of course, carried out with the instrument assembled but without the blood slide being in position, although the holder itself may be inserted in chamber 48 to block stray light, and the optical wedge retracted entirely from the light path it is designed to intercept, that is when cursor 40 is at the zero-set position mark 44. Once centered, the unit will remain in position due to the friction fit of socket shell 66 and conducting plate 112.

Conducting plate 112 is cupped to receive flange 67 of the socket shell 66 so that it can be turned about its axis while still maintaining electrical contact with plate 112 and provides a drag sufficient to maintain a set position.

What is claimed is:

1. In an optical hemoglobinometer comprising a casing, a light source, means for energizing said light source, a reflecting biprism, a viewed field formed by a dihedral angle in a second reflecting biprism, said angle forming a dividing line in said viewed field, a pair of similar light ray paths from said light source converging to form said viewed field, a colored filter in both of said converging paths, one of said paths before converging passing through a chamber, a removable specimen holder containing a blood slide positioned in said chamber and in said path, an optical wedge movable to intersect the other of said paths, and sighting means in an end wall of said casing arranged for viewing said viewed field, said wedge being movable to adjust the intensity of light in the path it intersects to correspond to that passing through a specimen in said holder, the improvement comprising a light source adjusting unit including external means for laterally centering said light source in order to provide uniform illumination along the dividing line of said viewed field when said blood slide and said wedge are both removed from intersection with their respective light ray paths, said light source being an incandescent bulb and socket means for receiving said bulb, said socket means being rotatable about its axis relative to said casing to control the position of said bulb and its filament relative to said viewed field.

2. In an optical hemoglobinometer of claim 1 including a rotatable and axially movable electrically conductive driver for making contact with the bulb, said driver being engaged with a contact spring biased to resiliently hold said driver away from said bulb and an external button fixedly attached to said driver and extending through the instrument wall so that when it is manually pressed said driver contacts said bulb, said driver being received into the socket so as to allow the simultaneous rotation of driver and socket and axial movement of said driver with relationship to said socket and said button having slotted means for being rotated whereby said button, driver socket and bulb can be rotated as a unit.

References Cited

UNITED STATES PATENTS

| | | | |
|---|---|---|---|
| 2,073,223 | 3/1937 | Rose | 356—40 X |
| 2,163,467 | 6/1939 | Philipsen | 356—40 |
| 2,396,260 | 3/1946 | Gradisar et al. | 356—42 |
| 2,481,567 | 9/1949 | Brown | 356—41 |
| 2,482,650 | 9/1949 | Brown et al. | 356—42 |
| 2,486,956 | 11/1949 | Lundberg | 356—42 |
| 3,035,483 | 5/1962 | Andreas et al. | 240—44.2 X |
| 3,319,512 | 5/1967 | Isreeli | 250—218 X |

RONALD L. WIBERT, Primary Examiner

W. A. SKLAR, Assistant Examiner

U.S. Cl. X.R.

240—44.2; 250—218; 356—42, 186, 246